United States Patent
Inoue

(10) Patent No.: US 10,243,367 B2
(45) Date of Patent: Mar. 26, 2019

(54) POWER SUPPLY SYSTEM, CONTROL METHOD OF POWER SUPPLY SYSTEM, AND POWER SUPPLY APPARATUS

(71) Applicant: KYOCERA CORPORATION, Kyoto-shi, Kyoto (JP)

(72) Inventor: Hirokazu Inoue, Yamato (JP)

(73) Assignee: KYOCERA Corporation, Kyoto (JP)

( * ) Notice: Subject to any disclaimer, the term of this patent is extended or adjusted under 35 U.S.C. 154(b) by 164 days.

(21) Appl. No.: 15/311,823

(22) PCT Filed: May 19, 2015

(86) PCT No.: PCT/JP2015/002514
§ 371 (c)(1),
(2) Date: Nov. 16, 2016

(87) PCT Pub. No.: WO2015/178016
PCT Pub. Date: Nov. 26, 2015

(65) Prior Publication Data
US 2017/0093162 A1   Mar. 30, 2017

(30) Foreign Application Priority Data

May 19, 2014   (JP) ................................. 2014-103630

(51) Int. Cl.
*H02J 3/38*        (2006.01)
*H02M 3/04*        (2006.01)
(Continued)

(52) U.S. Cl.
CPC ................ *H02J 3/382* (2013.01); *H02J 3/32* (2013.01); *H02J 3/381* (2013.01); *H02J 3/383* (2013.01);
(Continued)

(58) Field of Classification Search
USPC .......................................................... 307/52
See application file for complete search history.

(56) References Cited

U.S. PATENT DOCUMENTS

| 2014/0152097 | A1  | 6/2014 | Kitaji |
|---|---|---|---|
| 2014/0265585 | A1* | 9/2014 | Della Sera ................ H02J 3/38 307/52 |
| 2016/0064936 | A1  | 3/2016 | Satake et al. |

FOREIGN PATENT DOCUMENTS

| JP | 2007-049770 A | 2/2007 |
|---|---|---|
| JP | 2008-253033 A | 10/2008 |

(Continued)

OTHER PUBLICATIONS

International Search Report and Written Opinion issued by Japan Patent Office in corresponding International Application No. PCT/JP2015/002514.

*Primary Examiner* — Hal Kaplan
*Assistant Examiner* — Xuan Ly
(74) *Attorney, Agent, or Firm* — Procopio Cory Hargreaves and Savitch LLP

(57) ABSTRACT

In order to build a system capable of managing efficient operation control between a plurality of distributed power sources without compromising versatility of a distributed power source side, a power supply system of the disclosure herein is a power supply system having a plurality of distributed power sources including a battery and a power generation apparatus configured to generate power while forward power flow is detected, the power supply system including an interconnection operation switch to be closed during an interconnection operation such that an output from a grid is supplied to a load, a first current sensor disposed between the interconnection operation switch and the load, and configured to detect the forward power flow, a first supply path changeover switch capable of closing such that (Continued)

an output from the power generation apparatus is supplied to the load without passing through the first current sensor, and a second supply path changeover switch capable of closing such that the output from the power generation apparatus is supplied to the load via the first current sensor.

17 Claims, 13 Drawing Sheets

(51) Int. Cl.
  *H02M 7/44* (2006.01)
  *H02J 3/32* (2006.01)
  *H02J 7/34* (2006.01)
  *H02J 7/35* (2006.01)
(52) U.S. Cl.
  CPC ............... *H02J 3/387* (2013.01); *H02J 7/34* (2013.01); *H02J 7/35* (2013.01); *H02M 3/04* (2013.01); *H02M 7/44* (2013.01); *Y02E 10/563* (2013.01); *Y02E 10/566* (2013.01); *Y02E 70/30* (2013.01)

(56) References Cited

FOREIGN PATENT DOCUMENTS

| | | | |
|---|---|---|---|
| JP | 2011-188607 A | | 9/2011 |
| JP | WO2013015374 | * | 1/2013 |
| JP | 2013-126339 A | | 6/2013 |
| JP | 2013-207935 A | | 10/2013 |
| JP | 2014-212655 A | | 11/2014 |
| WO | 2013/015374 A1 | | 1/2013 |

* cited by examiner

POWER SUPPLY SYSTEM, CONTROL METHOD OF POWER SUPPLY SYSTEM, AND POWER SUPPLY APPARATUS

CROSS REFERENCE TO RELATED APPLICATION

This application claims priority to and the benefit of Japanese Patent Application No. 2014-103630 filed on May 19, 2014, the entire contents of which are incorporated herein by reference.

TECHNICAL FIELD

This disclosure relates to a power supply system, a control method of the power supply system, and a power supply apparatus.

BACKGROUND

There is known a generated power supply apparatus of a power generation system having power generation equipment such as a solar panel and the like, the generated power supply apparatus capable of performing a grid-interconnection operation for outputting AC power by interconnecting to a commercial power supply system (hereinafter, appropriately abbreviated to a grid) and an independent operation for outputting the AC power independently of the grid (e.g., PLT 1).

Also, there is known a storage power supply apparatus of a storage power system having power storage equipment such as a storage battery and the like charged by grid power, the storage power supply apparatus, similarly to the generated power supply system as described above, capable of performing the interconnection operation for outputting the AC power by interconnecting to the grid and the independent operation for outputting the AC power independently of the grid (e.g., PLT 2).

CITATION LIST

Patent Literature

PLT 1: JP2007049770A
PLT 2: JP2008253033A

SUMMARY

Technical Problem

Incidentally, the power supply system is required to centrally manage and operate a plurality of distributed power sources including a solar cell, the storage battery, a fuel cell, a gas power generator, and the like. It is especially required to build a system capable of managing efficient operation control between a plurality of distributed power sources without compromising versatility of a distributed power source side.

Accordingly, it could be helpful to provide a power supply system capable of managing the efficient operation control between a plurality of distributed power sources without compromising the versatility of the distributed power source side, a control method of the power supply system, and a power supply apparatus.

Solution to Problem

In order to solve the above problems, a power supply system according to the disclosure herein is a power supply system having a plurality of distributed power sources including a storage battery and a power generation apparatus configured to generate power while forward power flow is detected, the power supply system including: an interconnection operation switch to be closed during an interconnection operation such that an output from a grid is supplied to a load; a first current sensor disposed between the interconnection operation switch and the load, and configured to detect the forward power flow; a first supply path changeover switch capable of closing such that an output from the power generation apparatus is supplied to the load without passing through the first current sensor; and a second supply path changeover switch capable of closing such that the output from the power generation apparatus is supplied to the load via the first current sensor.

Also, in order to solve the above problems, a control method of a power supply system according to the disclosure herein is a control method of a power supply system having a plurality of distributed power sources including a storage battery and a power generation apparatus configured to generate power while forward power flow is detected, the control method of the power supply system including the steps of: closing an interconnection operation switch during an interconnection operation such that an output from a grid is supplied to a load; closing a switch such that an output from the power generation apparatus is supplied to the load without passing through a first current sensor, the first current sensor being disposed between the interconnection operation switch and the load, and configured to detect the forward power flow; and closing a switch such that the output from the power generation apparatus is supplied to the load via the first current sensor.

Further, in order to solve the above problems, a power supply apparatus according to the disclosure herein is a power supply apparatus configured to control a plurality of distributed power sources including a storage battery and a power generation apparatus configured to generate power while forward power flow is detected, the power supply apparatus including: a controller configured to control; an interconnection operation switch to be closed during an interconnection operation such that an output from a grid is supplied to a load; a first supply path changeover switch capable of closing such that an output from the power generation apparatus is supplied to the load without passing through a first current sensor, the first current sensor being disposed between the interconnection operation switch and the load, and configured to detect the forward power flow; and a second supply path changeover switch capable of closing such that the output from the power generation apparatus is supplied to the load via the first current sensor.

Advantageous Effect

According to the power supply system, the control method of the power supply system, and the power supply apparatus of the disclosure herein may manage efficient operation control between the plurality of distributed power sources without compromising versatility of a distributed power source side.

BRIEF DESCRIPTION OF THE DRAWINGS

In the accompanying drawings.

DETAILED DESCRIPTION

Hereinafter, embodiments of the disclosure herein will be described in detail with reference to the drawings.

A power supply system according to the embodiments of the disclosure herein will be described. The power supply system according to the present embodiments includes a distributed power source for supplying, in addition to power supplied from a grid, power which may be sold, and/or a distributed power source for supplying, in addition to the power supplied from the grid, power which may not be sold. The distributed power source for supplying the power which may be sold includes a system for supplying the power by using, for example, a solar photovoltaic generation. On the other hand, the distributed power source for supplying the power which may not be sold includes a storage battery system capable of charging and discharging the power, a fuel cell system having a fuel cell such as SOFC (Solid Oxide Fuel Cell), and a gas power generation system for generating the power by using fuel gas. In the present embodiment, the power supply system includes a solar cell as the distributed power source for supplying the power which may be sold, a storage battery as the distributed power source for supplying the power which may not be sold, and a power generation apparatus constituted by using the fuel cell or a gas power generator.

First Embodiment

Figure 1:
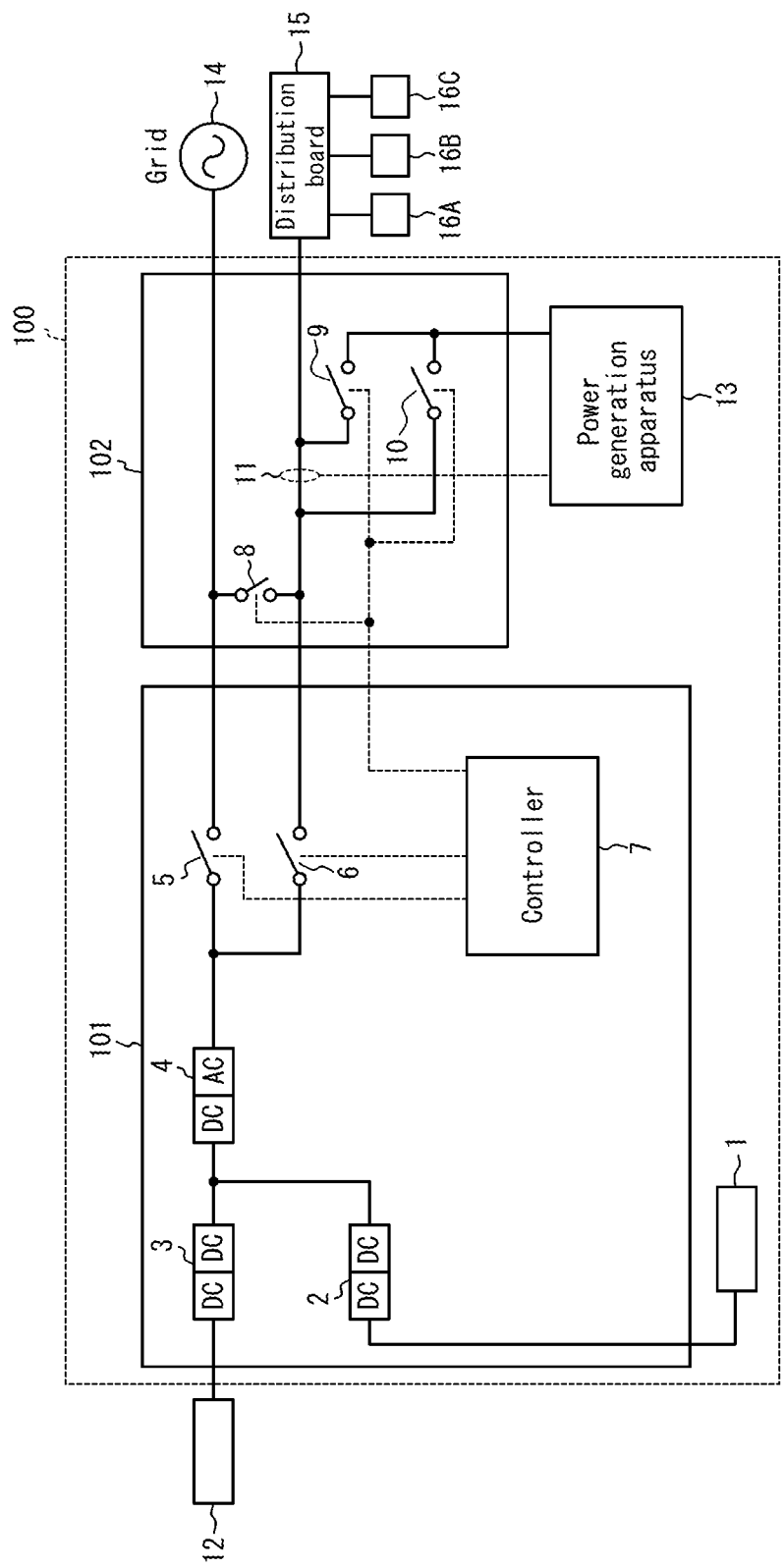
FIG. 1 is a block diagram of a power supply system according to a first embodiment of the disclosure herein.

FIG. 1 is a block diagram illustrating a schematic configuration of a power supply system 100 according to a first embodiment of the disclosure herein. The power supply system 100 of the present embodiment includes a power supply apparatus 101, a dedicated distribution board 102, a storage battery 1, and a power generation apparatus 13. FIG. 1 also illustrates a solar cell 12, a grid 14, a distribution board 15, and loads 16A to 16C, all of which are used while being connected to the power supply system 100. Here, the power generation apparatus 13 may be constituted by using the fuel cell or the gas power generator.

The power supply apparatus 101 includes DC-DC converters 2 and 3, an inverter 4, a first interconnection operation switch 5, an independent operation switch 6, and a controller 7. The power supply apparatus 101 configures what is called a multiple-DC-link system for performing power control by connecting, without converting, DC power from the storage battery 1 and the solar cell 12 which are externally provided. The power supply apparatus 101 converts the DC power supplied from the solar cell 12 and the storage battery 1 and AC power supplied from the grid 14 and the power generation apparatus 13 and controls changeover between an interconnection operation and an independent operation. Although according to the present embodiment the storage battery 1, the solar cell 12, and the power generation apparatus 13 are provided external to the power supply apparatus 101 and used while being connected thereto, the disclosure herein is not limited to such a mode. Some or all of the storage battery 1, the solar cell 12, and the power generation apparatus 13 may be provided inside the power supply apparatus 101.

The dedicated distribution board 102 includes a second interconnection operation switch 8, a first supply path changeover switch 9, a second supply path changeover switch 10, and a first current sensor 11. The second interconnection operation switch 8 is controlled to be ON/OFF in conjunction with the first interconnection operation switch 5. The first supply path changeover switch 9 and the second supply path changeover switch 10 are switches for managing efficient operation control between the distributed power sources without compromising versatility of a distributed power source side. A detailed description thereof will be presented later.

The power supply system 100 normally performs the interconnection operation with the grid 14 and supplies power from the grid 14 and power from each of the distributed power sources (the solar cell 12, the storage battery 1, and the power generation apparatus 13) to the loads 16A to 16C. Also, the power supply system 100 performs the independent operation when there is no power supply from the grid 14 due to power outage and the like and supplies the power from each of the distributed power sources (the solar cell 12, the storage battery 1, and the power generation apparatus 13) to the loads 16A to 16C. When the power supply system 100 performs the independent operation, each of the distributed power sources (the solar cell 12, the storage battery 1, and the power generation apparatus 13) is parallel-off from the grid 14 and, when the power supply system 100 performs the interconnection operation, each of the distributed power sources (the solar cell 12, the storage battery 1, and the power generation apparatus 13) is parallel with the grid 14.

In FIG. 1, a solid line connecting each functional block represents wiring for flowing the power, and a broken line connecting each functional block represents flow of a control signal or information communicated. A communication indicated by the broken line may be either a wired communication or a radio communication. The communication of the control signal and the information in each hierarchy may employ various communication schemes. For example, a communication employing a short-range communication scheme such as ZigBee® (ZigBee is a registered trademark in Japan, other countries, or both) may be used. Or, various transmission media such as an infrared communication, a power line communication (PLC: Power Line Communication), and the like may be used. Further, on a lower layer including a physical layer suitable for each communication, various communication protocols such as, for example, ZigBee SEP 2.0 (Smart Energy Profile 2.0) and ECHONET Lite® (ECHONET Lite is a registered trademark in Japan, other countries, or both) defining a logical layer alone may be operated.

The solar cell 12 converts solar energy into the DC power. The solar cell 12 includes, for example, power generation units having photoelectric conversion cells connected in a matrix form and is configured to output a predetermined short-circuit current (e.g., 10 A). The solar cell 12 may be of any type such as a silicon-based polycrystalline solar cell, a silicon-based monocrystal solar cell, a thin-film solar cell such as CIGS, and the like, so long as being capable of performing photoelectric conversion.

The storage battery 1 is constituted by using a lithium-ion battery, a nickel hydrogen battery, or the like. The storage battery 1 may supply power by discharging charged power. Also, the storage battery 1 may store power supplied from the grid 14, the solar cell 12, and, as described later, the power generation apparatus 13.

The DC-DC converters 2 and 3 boost the DC power from the solar cell 12 and the storage battery 1 to a certain voltage. Respective step-up ratios of the DC-DC converters 2 and 3 may be preliminarily fixed values or appropriately controlled by the controller 7. According to the present embodiment, the DC power from the solar cell 12 and the DC power from the storage battery 1 are in DC-link and thus need to be boosted to the same voltage.

The inverter 4 is a bi-directional inverter and converts the DC power supplied from the solar cell 12 and the storage battery 1 into the AC power and the AC power supplied from the grid 14 and the power generation apparatus 13 into the DC power.

The first and second interconnection operation switches 5 and 8 and the independent operation switch 6 are respectively constituted by using a relay, a transistor, or the like and controlled to be ON/OFF. As illustrated in the figure, the independent operation switch 6 is disposed between the power generation apparatus 13 and the storage battery 1. The first and second interconnection operation switches 5 and 8 and the independent operation switch 6 are switched through a state in which all of them are OFF, avoiding all of them to be ON at the same time. In particular, in switching from the independent operation to the interconnection operation, the independent operation switch 6 is turned off, and then the first and second interconnection operation switches 5 and 8 are turned on. Also, in switching from the interconnection operation to the independent operation, the first and second interconnection operation switches 5 and 8 are turned off, and then the independent operation switch 6 is turned on.

The above control of the first and second interconnection operation switches 5 and 8 and the independent operation switch 6 may be implemented by, for example, using software executed by the controller 7. However, as an exception, when the power supply from each of the distributed power sources are OFF, the second interconnection operation switch 8 alone is turned on and both the first interconnection operation switch 5 and the independent operation switch 6 are turned off, such that the power from the grid 14 alone is supplied to the distribution board 15.

The controller 7 is constituted by using, for example, a microcomputer and, based on an increase in a voltage of the grid or a state such as the power outage and the like, controls operations of the inverter 4, the first and second interconnection operation switches 5 and 8, the independent operation switch 6, the first supply path changeover switch 9, the second supply path changeover switch 10, and the like. The controller 7, for the interconnection operation, turns on the first and second interconnection operation switches 5 and 8 and turns off the independent operation switch 6. Also, the controller 7, for the independent operation, turns off the first and second interconnection operation switches 5 and 8 and turns on the independent operation switch 6.

The first supply path changeover switch 9 and the second supply path changeover switch 10 are respectively constituted by using the relay, the transistor, or the like and controlled to be ON/OFF. The controller 7, based on an operation state of each of the distributed power sources and the like, controls such that one of the first supply path changeover switch 9 and the second supply path changeover switch 10 is ON and the other is OFF.

The first current sensor 11 detects a current flowing between the grid 14 and the power generation apparatus 13 and is disposed between the second interconnection operation switch 8 and the loads 16A to 16C. In Japan, since it is prescribed that the power generated by the power generation apparatus 13 cannot be sold, when the first current sensor 11 detects backward power flow (a current in a power-selling direction) toward the grid 14, the power generation apparatus 13 stops generating the power. While the first current sensor 11 is detecting forward power flow, the power generation apparatus 13 is considered to be able to supply the power to the loads 16A to 16C and generates the power by performing a load-following operation or a rated operation.

The power generation apparatus 13 is constituted by using the fuel cell or the gas power generator. The fuel cell includes a cell for generating the DC power by using hydrogen and utilizing a chemical reaction thereof with oxygen in the air, an inverter for converting thus generated DC power into AC power of 100 V or 200 V, and other auxiliaries. Here, the fuel cell serving as the power generation apparatus 13 is a system capable of supplying the AC power to the loads 16A to 16C without the power supply apparatus 101, and therefore does not necessarily need to be designed assuming a connection to the power supply apparatus 101 but may be a versatile system. Also, the gas power generator generates power with a gas engine using prescribed gas as fuel.

The power generation apparatus 13 generates the power while the first current sensor 11 detects the forward power flow (a current in a power-purchasing direction) and, when generating the power, performs the load-following operation to follow power consumption of the loads 16A to 16C or the rated operation based on a predetermined rated power value. A following range during the load-following operation is, for example, 200 W to 700 W, and the rated power value during the rated operation is, for example, 700 W. The power generation apparatus 13 may perform the load-following operation to follow the power consumption of the loads 16A to 16C during the interconnection operation, or the rated operation with the rated power value during the independent operation.

The distribution board 15 separates the power supplied from the grid 14 during the interconnection operation into a plurality of branches and allocates the power to the loads 16A to 16C. Also, the distribution board 15 separates the power supplied from the plurality of distributed power sources (the solar cell 12, the storage battery 1, and the power generation apparatus 13) during the independent operation into a plurality of branches and allocates the power to the loads 16A to 16C. Here, the loads 16A to 16C are power loads which consume power and may be any electric appliance such as, for example, an air conditioner, a microwave oven, a television and the like used in a house, or a machine such as air-conditioning equipment and lighting equipment, lighting facility, and the like used in an industrial facility.

Hereinafter, an example of control of the power supply system 100 according to the present embodiment will be described in detail with reference to the drawings.

Example of Control During Interconnection Operation

Figure 2:
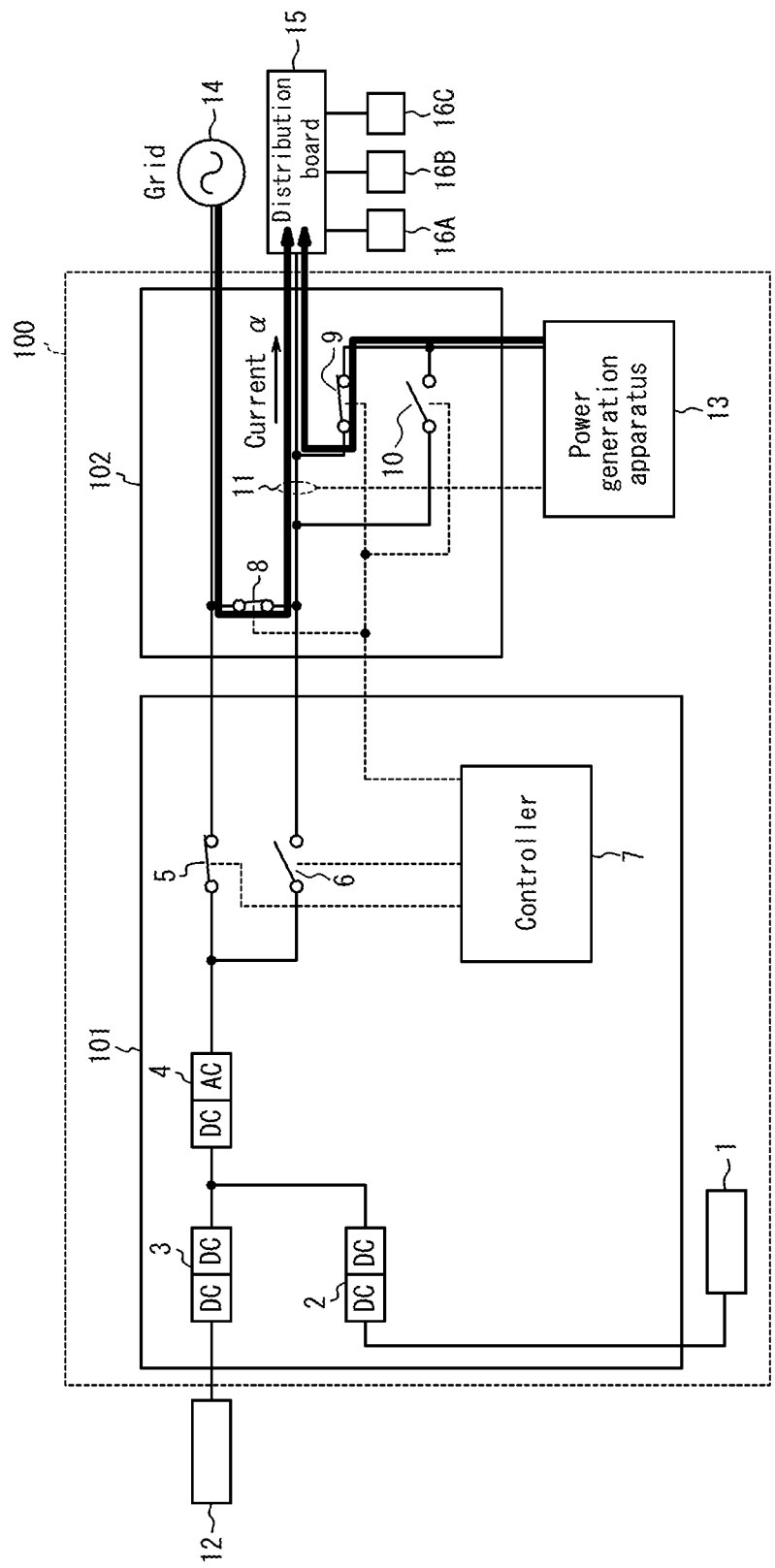
FIG. 2 is a diagram illustrating an example of control of the power supply system during an interconnection operation according to the first embodiment of the disclosure herein.

FIG. 2 is a diagram illustrating an example of control of the power supply system 100 during the interconnection operation. In this case, the first and second interconnection operation switches 5 and 8 are turned on and the independent operation switch 6 is turned off. As for each switch for changeover between supply paths, the first supply path changeover switch 9 is turned on and the second supply path changeover switch 10 is turned off.

During the interconnection operation, as indicated by a bold arrow, AC 100 V (or 200 V) is supplied to the loads 16A to 16C from the grid 14. Also, the power supply apparatus 101, when the charging of the storage battery 1 is not completed, converts the AC power from the grid 14 into the DC power and charges the storage battery 1. Further, the power supply apparatus 101 may convert the power generated by the solar cell 12 into the AC power and inversely flow the AC power to the grid 14 to sell excessive power. Since forward power (the current in the power-purchasing direction) flows to the first current sensor 11 from the grid 14, the power generation apparatus 13 performs load-following power generation such that the detection of the forward power flow by the first current sensor 11 reaches a target value. As a result, the power generated by the power generation apparatus 13, as indicated by the bold arrow, is supplied to the loads 16A to 16C via the first supply path changeover switch 9 and the distribution board 15. Note that, in FIG. 2, a represents a total current supplied to the loads 16A to 16C.

Example of Control During Independent Operation

Figure 3:
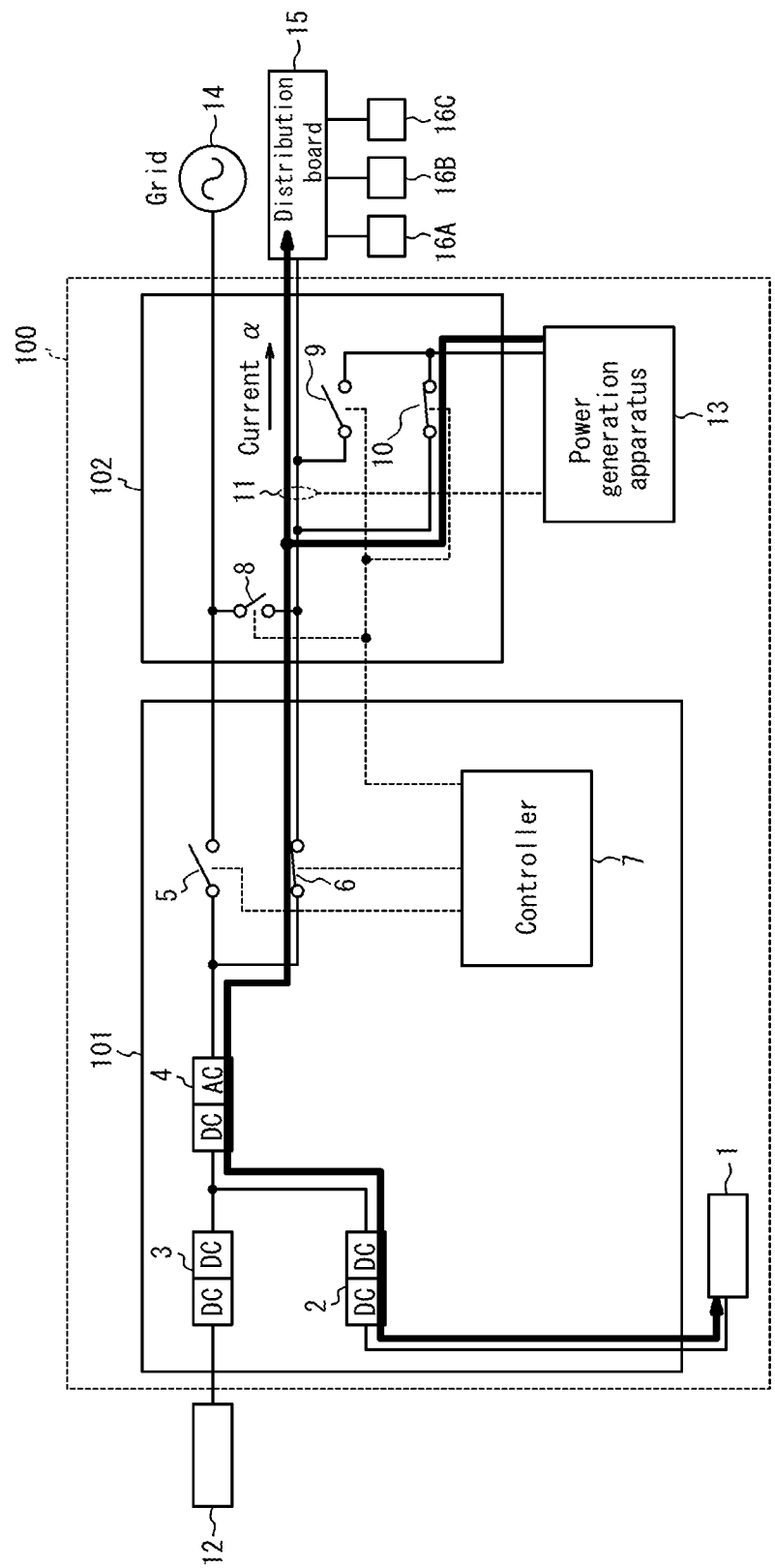
FIG. 3 is a diagram illustrating an example of control of the power supply system during an independent operation (during charging) according to the first embodiment of the disclosure herein.

Referring to FIG. 3, next, an example of control of the power supply system 100 during the independent operation will be described. The first and second interconnection operation switches 5 and 8 are turned off, and the independent operation switch 6 is turned on. As for each switch for the changeover between the supply paths, the first supply path changeover switch 9 is turned off, and the second supply path changeover switch 10 is turned on.

FIG. 3 is an example of the control during the independent operation in which the power generation apparatus 13 generates power by performing the rated operation when the loads 16A to 16C are consuming at least certain power at all times. Since the second supply path changeover switch 10 is ON, the power generated by the power generation apparatus 13 is supplied to the loads 16A to 16C via the first current sensor 11. That is, since the power from each of the distributed power sources (the solar cell 12, the storage battery 1, and the power generation apparatus 13) is supplied to the loads 16A to 16C via the first current sensor 11 and the distribution board 15, a current in a forward flow direction is detected by the first current sensor 11 at all times, and thus the power generation apparatus 13 may generate power. At this time, when the generated power is increased such that the detection of the forward power flow by the first current sensor 11 follows the target value, the detection of the forward power flow does not decrease to the target value. Therefore, the power generation apparatus 13 generates the power by performing the rated operation. Although the power generated by the power generation apparatus 13 is supplied to the loads 16A to 16C as indicated by a bold line in FIG. 3, when the generated power exceeds the power consumption of the loads 16A to 16C, such excessive power is stored in the storage battery 1.

Figure 4:
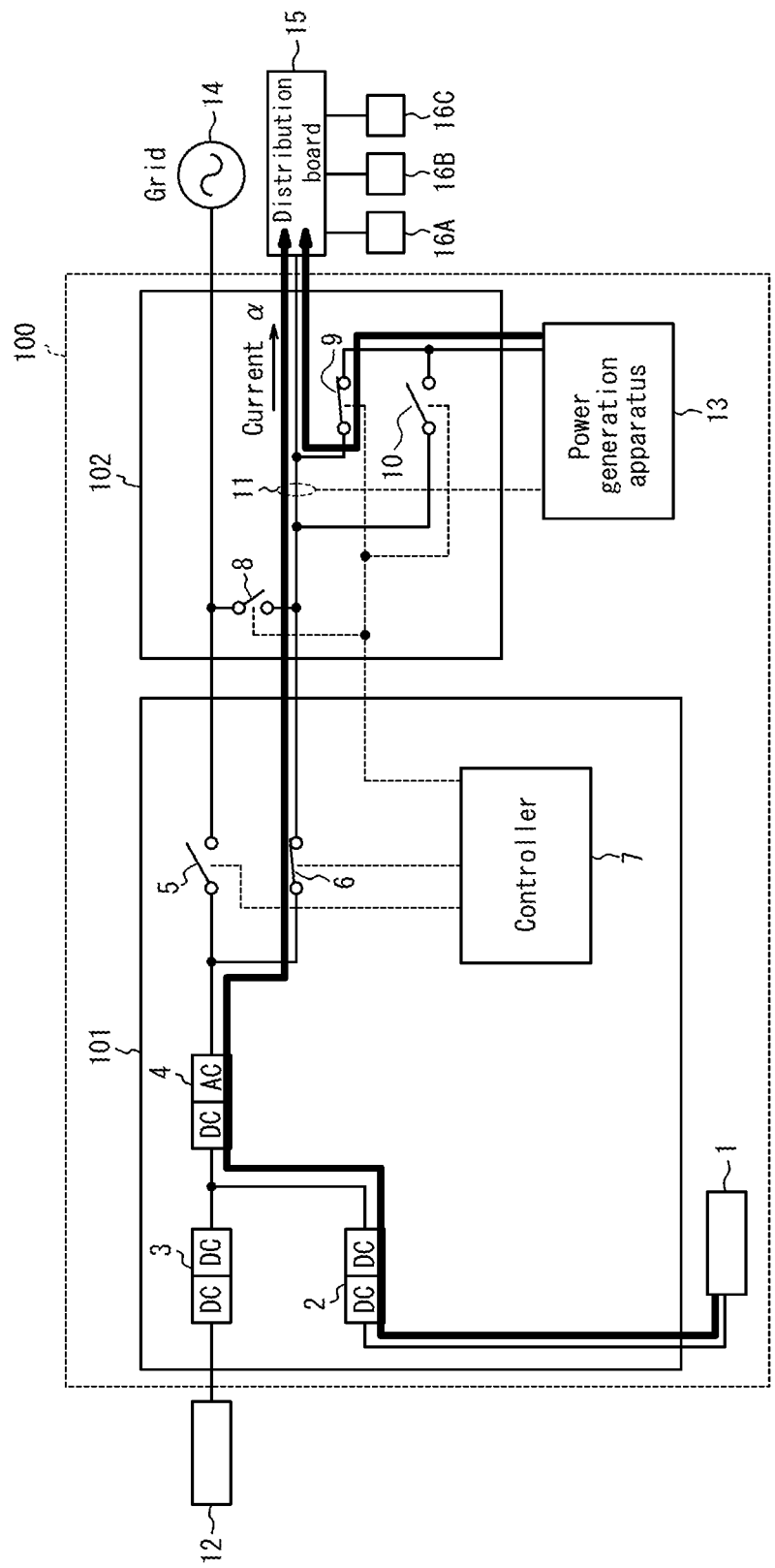
FIG. 4 is a diagram illustrating an example of control of the power supply system during the independent operation (during discharging) according to the first embodiment of the disclosure herein.

In the example of the control in FIG. 3, when the storage battery 1 is fully charged, the controller 7, as illustrated in FIG. 4, turns on the first supply path changeover switch 9 and turns off the second supply path changeover switch 10. Then, the controller 7 causes the storage battery 1 to start discharging. Thereby, the power generated by the power generation apparatus 13 is supplied to the loads 16A to 16C without passing through the first current sensor 11. Then, the power discharged from the storage battery 1 flows via the first current sensor 11. The power generation apparatus 13 operates suppressing the power generation thereof such that the detection of the forward power flow by the first current sensor 11 reaches a certain target value. That is, the power generation apparatus 13 performs the load-following operation to generate the power following the power consumption of the loads 16A to 16C.

In an example of control in FIG. 4, when a charge amount of the storage battery 1 falls below a predetermined threshold, the controller 7 once again controls to turn off the first supply path changeover switch 9 and turn on the second supply path changeover switch 10, and starts charging the storage battery 1 with the power from the power generation apparatus 13.

Note that, when the second supply path changeover switch 10 is erroneously turned on while the second interconnection operation switch 8 is ON, the backward power flow from the power generation apparatus 13 to the grid 14 may not be detected by the first current sensor 11. Therefore, it is preferred to have a circuit configuration which, in conjunction with the turning on the second interconnection operation switch 8, may turn on the first supply path changeover switch 9 and turn off the second supply path changeover switch 10.

Incidentally, the present embodiment assumes that, by the power consumption of the loads 16A to 16C, a current a which is at least equal to a threshold allowing the power generation apparatus 13 to start the power generation flows to the loads 16A to 16C. However, when the current a flowing to the loads 16A to 16C does not satisfy an operation standard of the power generation apparatus 13, the power generation apparatus 13 cannot start the power generation.

Figure 5:
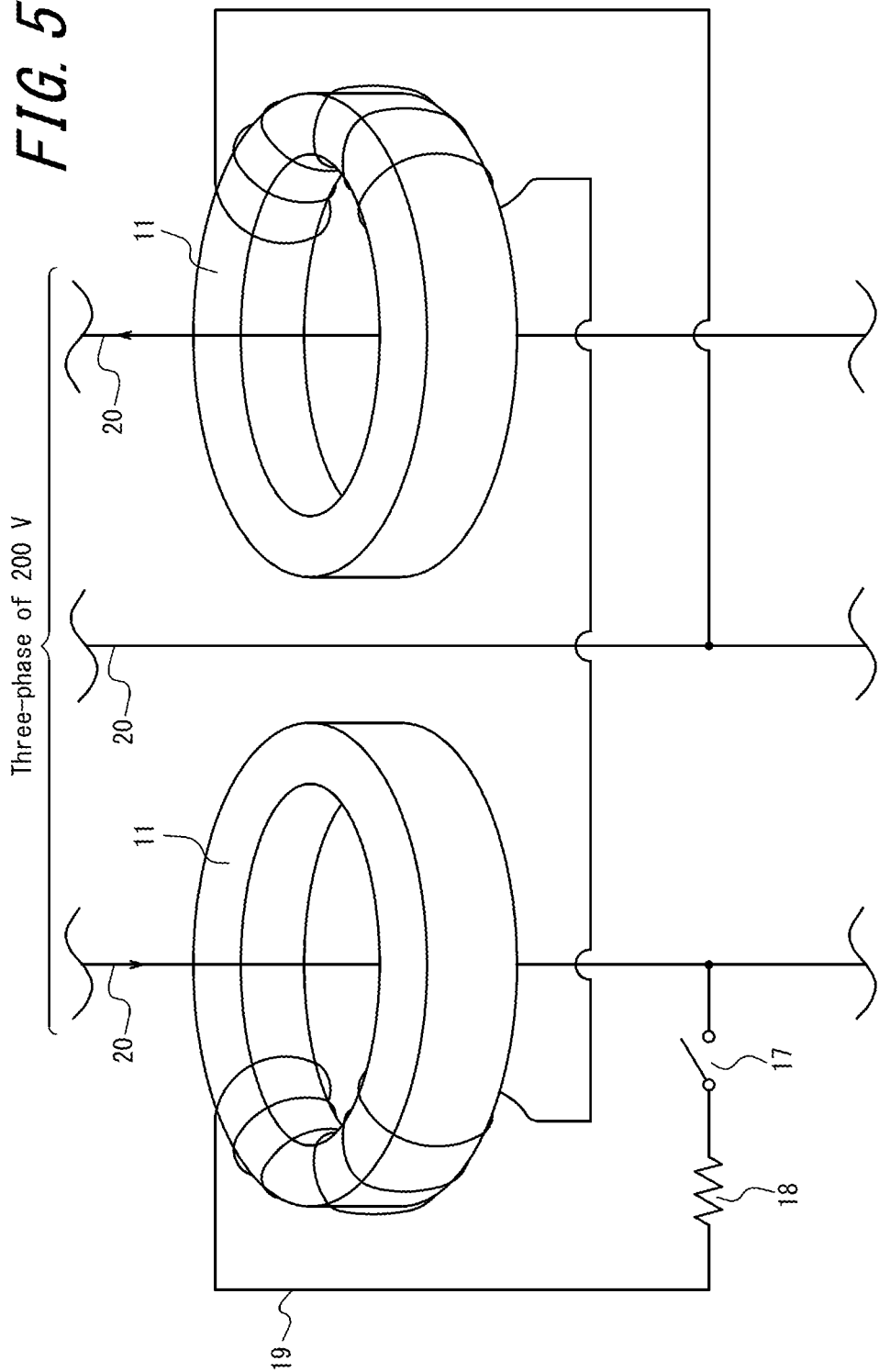
FIG. 5 illustrates an example of wiring of a dummy-output line for flowing a dummy current to a first current sensor.

As such, during the independent operation, together with the control to turn off the first supply path changeover switch 9 and turn on the second supply path changeover switch 10, the first current sensor 11 may be caused to detect a dummy current in the forward flow direction. FIG. 5 illustrates an example of a configuration in which the first current sensor 11 is caused to detect the dummy current in the forward flow direction. A dummy-output line 19 connected to a power line 20 of a single three-phase of 200 V is wound about the first current sensor 11 a predetermined number of times. Thereby, regardless of a direction of the current flowing in the power line 20, the first current sensor 11 may be caused to simulatively detect a current in a forward power direction. Note that a value of the dummy current is determined based on a voltage of the power line 20 to which the dummy-output line 19 is connected, a dummy-current load 18, and the number of times the dummy-output line 19 is wound about the first current sensor 11. Also, the controller 7 controls a dummy-current control switch 17 so as to turn on/off the dummy current.

According to the present embodiment, as described above, during the independent operation, the power generated by the power generation apparatus 13 may be sent to the storage battery 1 without passing through the first current sensor 11 for detecting the backward power flow. During the independent operation, therefore, the excessive power of the power generation apparatus 13 may be stored in the storage battery 1.

According to the present embodiment, also, during the independent operation, depending on a charging state of the storage battery 1, one of the first supply path changeover switch 9 and the second supply path changeover switch 10 is controlled to be ON. Therefore, when the storage battery 1 may be charged, the excessive power of the power generation apparatus 13 may be stored in the storage battery 1.

According to the present embodiment, further, during the independent operation, the power is supplied from the distributed power sources (the solar cell 12, the storage battery 1, and the power generation apparatus 13) such that the first current sensor 11 detects the dummy current in the forward flow direction. Therefore, the power generation apparatus 13 may reliably generate the power during the independent operation, and the excessive power generated by the power generation apparatus 13 may be stored in the storage battery 1.

Second Embodiment

Figure 6:
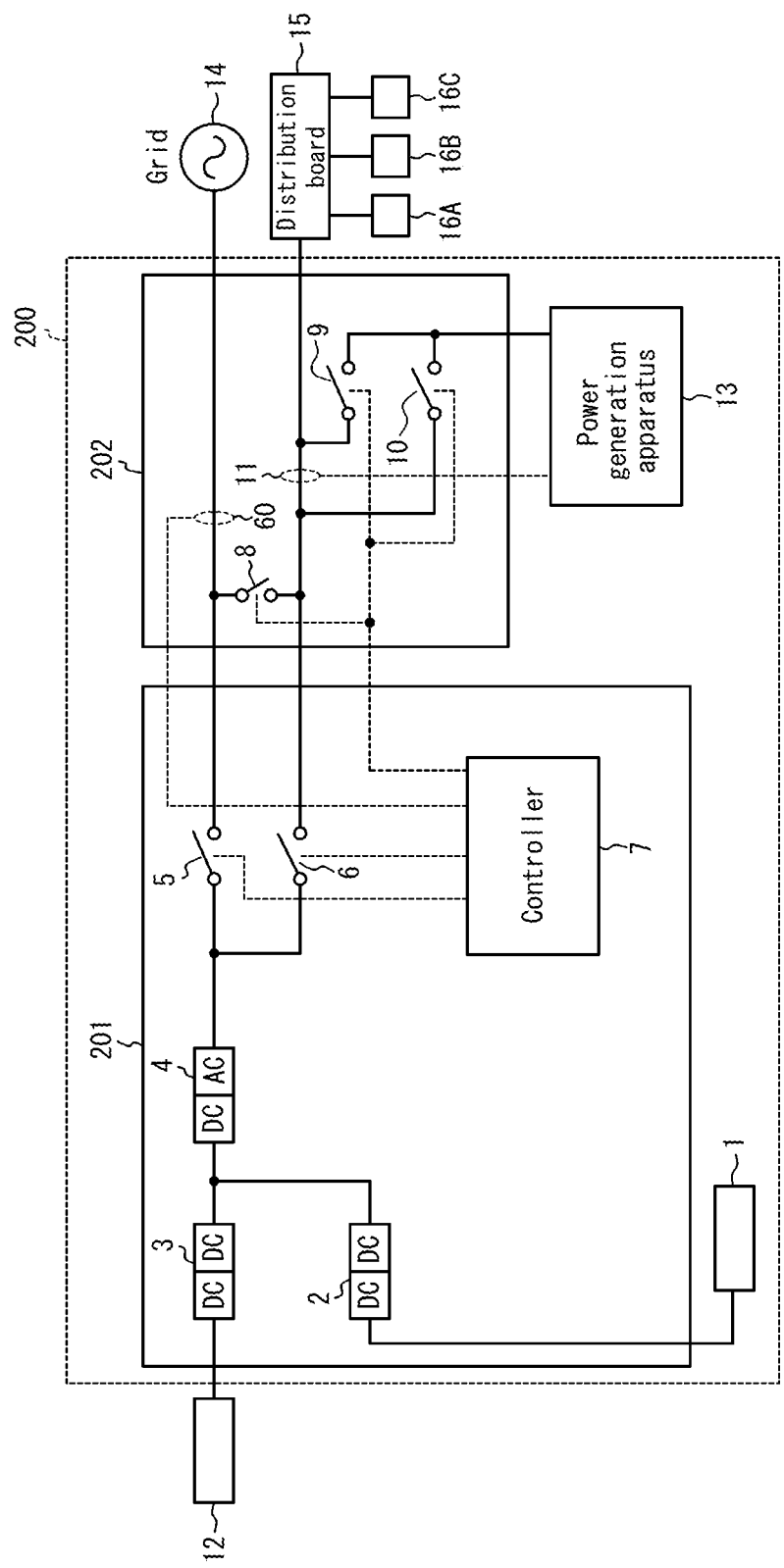
FIG. 6 is a block diagram of a power supply system according to a second embodiment of the disclosure herein.

FIG. 6 is a block diagram illustrating a schematic configuration of a power supply system 200 according to a second embodiment of the disclosure herein. The power supply system 200 according to the present embodiment includes a power supply apparatus 201, a dedicated distribution board 202, the storage battery 1, and the power generation apparatus 13. FIG. 6 also illustrates the solar cell 12, the grid 14, the distribution board 15, and the loads 16A to 16C, all of which are used while being connected to the power supply system 200. The power supply system 200 has the same configuration as that of the power supply system 100 of the first embodiment, except having, in the dedicated distribution board 202, a second current sensor 60 disposed between the grid 14 and the second interconnection operation switch 8 such that the controller 7 may obtain a result of detection by the second current sensor 60. Therefore, an overlapping description will be omitted here. Note that the power supply system 200 includes all of the constituents of the power supply system 100 of the first embodiment and thus may perform the same operation as the first embodiment.

The dedicated distribution board 202 includes the second interconnection operation switch 8, the first supply path changeover switch 9, the second supply path changeover switch 10, the first current sensor 11, and the second current sensor 60. The second current sensor 60 is a sensor provided to detect backward power flow from the power supply apparatus 201 or the dedicated distribution board 202 to the grid 14.

The following is a detailed description of an example of control of the power supply system 200 according to the present embodiment with reference the drawings.

Example of Control During Interconnection Operation

Figure 7:
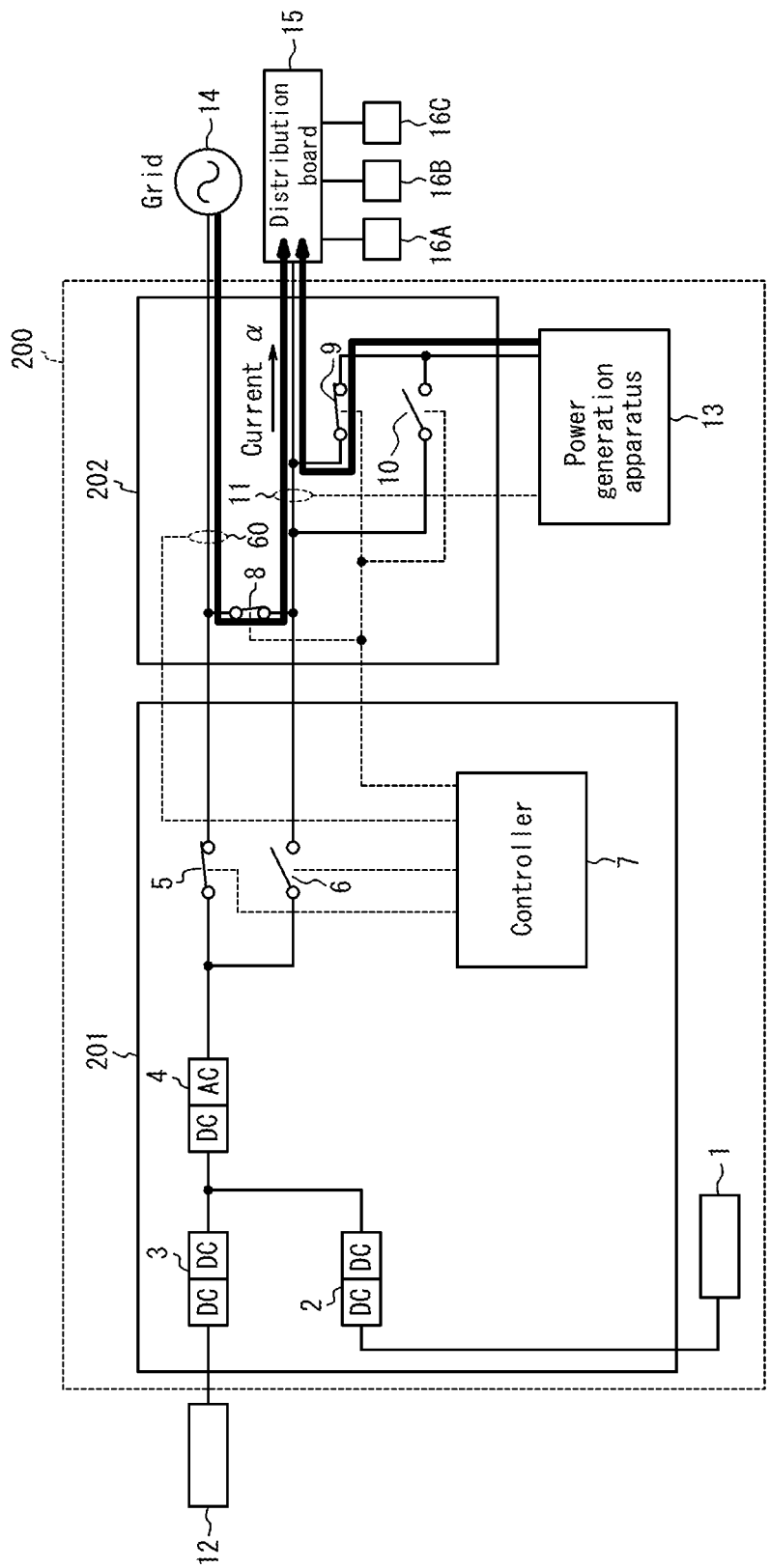
FIG. 7 is a diagram illustrating an example of control of the power supply system during the interconnection operation (a load-following operation) according to the second embodiment of the disclosure herein.

FIG. 7 is a diagram illustrating an example of control of the power supply system 200 during the interconnection operation. In this case, the first and second interconnection operation switches 5 and 8 are turned on, and the independent operation switch 6 is turned off. As for the switches for the changeover between the supply paths, the first supply path changeover switch 9 is turned on, and the second supply path changeover switch 10 is turned off.

During the interconnection operation, as indicated by a bold arrow, the AC 100V (or 200 V) from the grid 14 is supplied to the loads 16A to 16C. Since the forward power flow (the current in the power-purchasing direction) from the grid 14 is received by the first current sensor 11, the power generation apparatus 13 generates the power by performing the load-following operation such that the detection of the forward power flow by the first current sensor 11 reaches the certain target value. As a result, the power generated by the power generation apparatus 13, as indicated by a bold arrow, is supplied to the loads 16A to 16C via the first supply path changeover switch 9 and the distribution board 15.

At this time, the second current sensor 60 detects the current in the forward power direction from the grid 14 to the loads 16A to 16C. The controller 7, when the second current sensor 60 detects the forward power flow, controls each switch in such a manner that the first supply path changeover switch 9 is turned off and the second supply path changeover switch 10 is turned on and, simultaneously, monitors a results of the detection by the second current sensor 60 in a continuous manner. A state of the power supply system 200 at this time is illustrated in FIG. 8.

Figure 8:
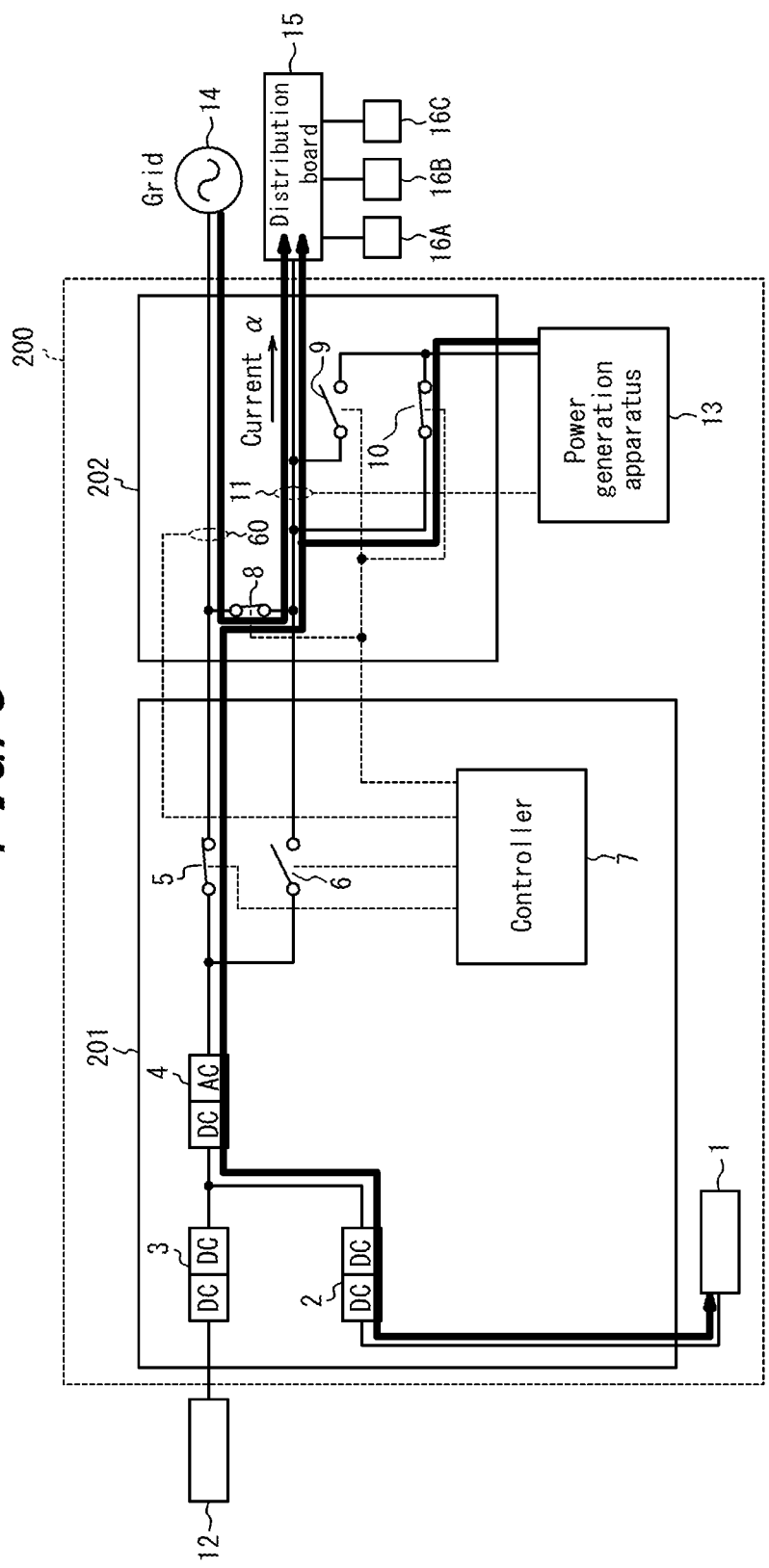
FIG. 8 is a diagram illustrating an example of control of the power supply system during the interconnection operation (during charging) according to the second embodiment of the disclosure herein.

In FIG. 8, since the first supply path changeover switch 9 is OFF and the second supply path changeover switch 10 is ON, the power generated by the power generation apparatus 13 is supplied to the loads 16A to 16C via the second supply path changeover switch 10 and the first current sensor 11. Therefore, all the current supplied to the loads 16A to 16C pass through the first current sensor 11, and thus the first current sensor 11 may detect the forward power flow at all times. Also, the power generation apparatus 13 may perform the rated operation at all times. Further, when a power generation amount of the power generation apparatus 13 exceeds the power consumption of the loads 16A to 16C, the controller 7, as indicated by a bold line in FIG. 8, may store the excessive power of the power generation apparatus 13 in the storage battery 1 via the second interconnection operation switch 8 and the first interconnection operation switch 5. While the power generated by the power generation apparatus 13 is stored in the storage battery 1, the controller 7 monitors the current flowing to the second current sensor 60 and controls a charging amount of the storage battery 1 such that the second current sensor 60 receives the forward power flow in a certain amount at all times. Then, in case that the current in the forward power direction falls below the predetermined threshold, the controller 7 controls once again to turn on the first supply path changeover switch 9 and turn off the second supply path changeover switch 10. Thereby, the power generation apparatus 13 once again performs the load-following operation of FIG. 7, stopping charging the storage battery 1.

Example of Control During Independent Operation

Control during the independent operation according to the second embodiment is the same as that of the first embodiment and thus will be omitted here.

According to the present embodiment, as described above, during the interconnection operation, without causing the backward power flow from the power generation apparatus 13 to the grid 14, the excessive power of the power generation apparatus 13 may be stored in the storage battery 1.

Third Embodiment

Figure 9:
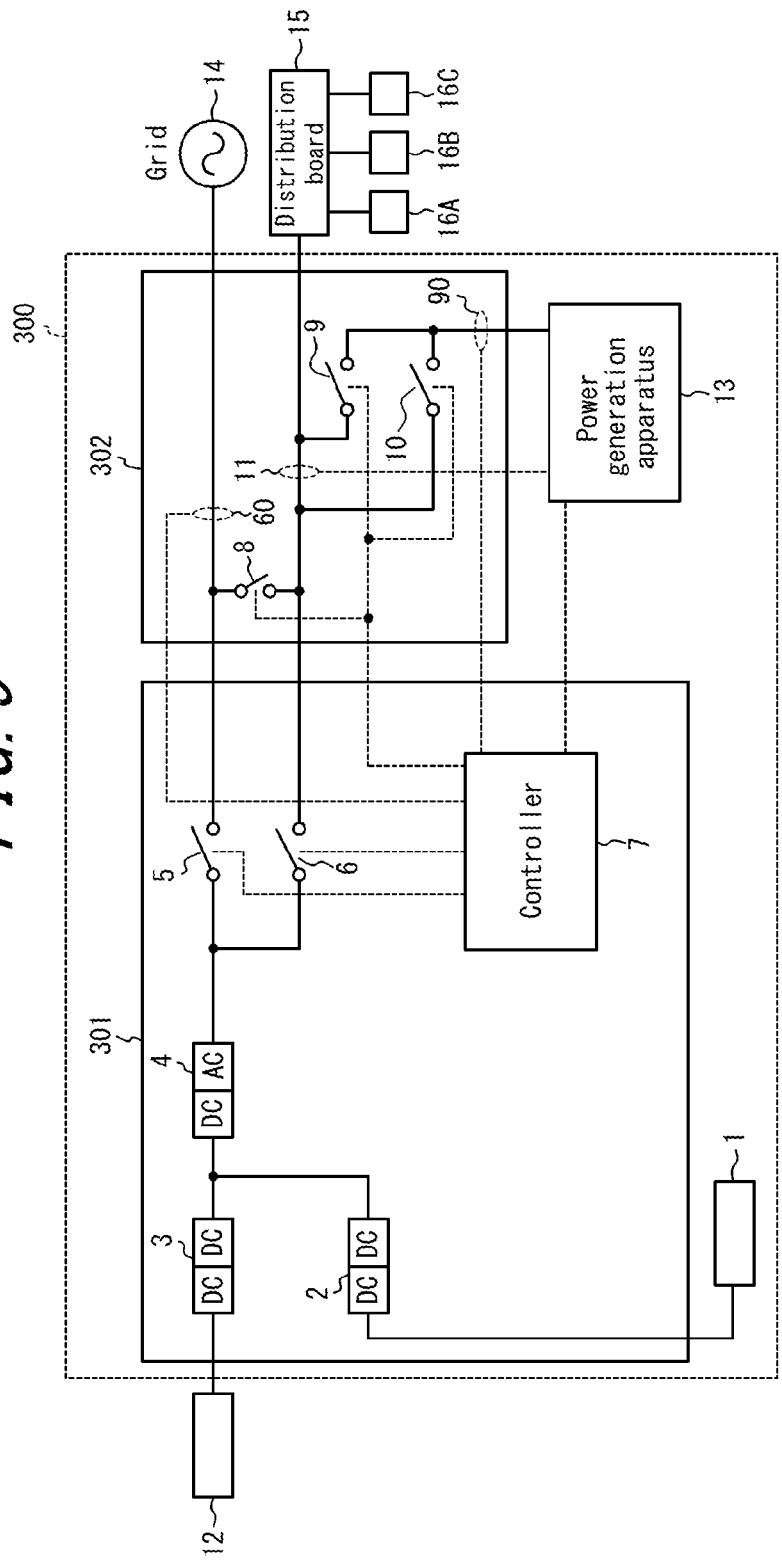
FIG. 9 is a block diagram of a power supply system according to a third embodiment of the disclosure herein.

FIG. 9 is a block diagram illustrating a schematic configuration of a power supply system 300 according to a third embodiment of the disclosure herein. The power supply system 300 according to the present embodiment includes a power supply apparatus 301, a dedicated distribution board 302, the storage battery 1, and the power generation apparatus 13. FIG. 9 also illustrates the solar cell 12, the grid 14, the distribution board 15, and the loads 16A to 16C, all of which are used while being connected to the power supply system 300. The power supply system 300 has the same configuration as that of the power supply system 200 according to the second embodiment, except that, as illustrated in FIG. 9, a third current sensor 90 is disposed at an output section of the power generation apparatus 13, and that the controller 7 may obtain a result of detection by the third current sensor 90 and receive a self-check signal from the power generation apparatus 13. Therefore, an overlapping description will be omitted here. Note that the power supply system 300 includes all of the constituents of the power supply system 100 of the first embodiment and the power supply system 200 of the second embodiment and thus may perform the same operation as the first and second embodiments.

The dedicated distribution board 302 includes the second interconnection operation switch 8, the first supply path changeover switch 9, the second supply path changeover switch 10, the first current sensor 11, the second current sensor 60, and the third current sensor 90. The third current sensor 90 is provided to detect the self-check of the current sensor performed by the power generation apparatus 13.

The self-check performed by the power generation apparatus 13 is checking of the current sensor to monitor the backward power flow from the power generation apparatus to the grid. According to the present embodiment, the power generation apparatus 13 changes output power on purpose, and the self-check is performed to see whether the current flowing to the first current sensor 11 also changes in response to the change in the output power. The output power is intentionally changed in the following manner: for example, the power generation apparatus 13 suspends the power generation or reduces the power generation amount and temporality receives the power supply from the grid 14, thereby changing the current.

The following is a detailed description of an example of control of the power supply system 300 according to the present embodiment with reference to the drawings.

Example of Control During Interconnection Operation

Figure 10:
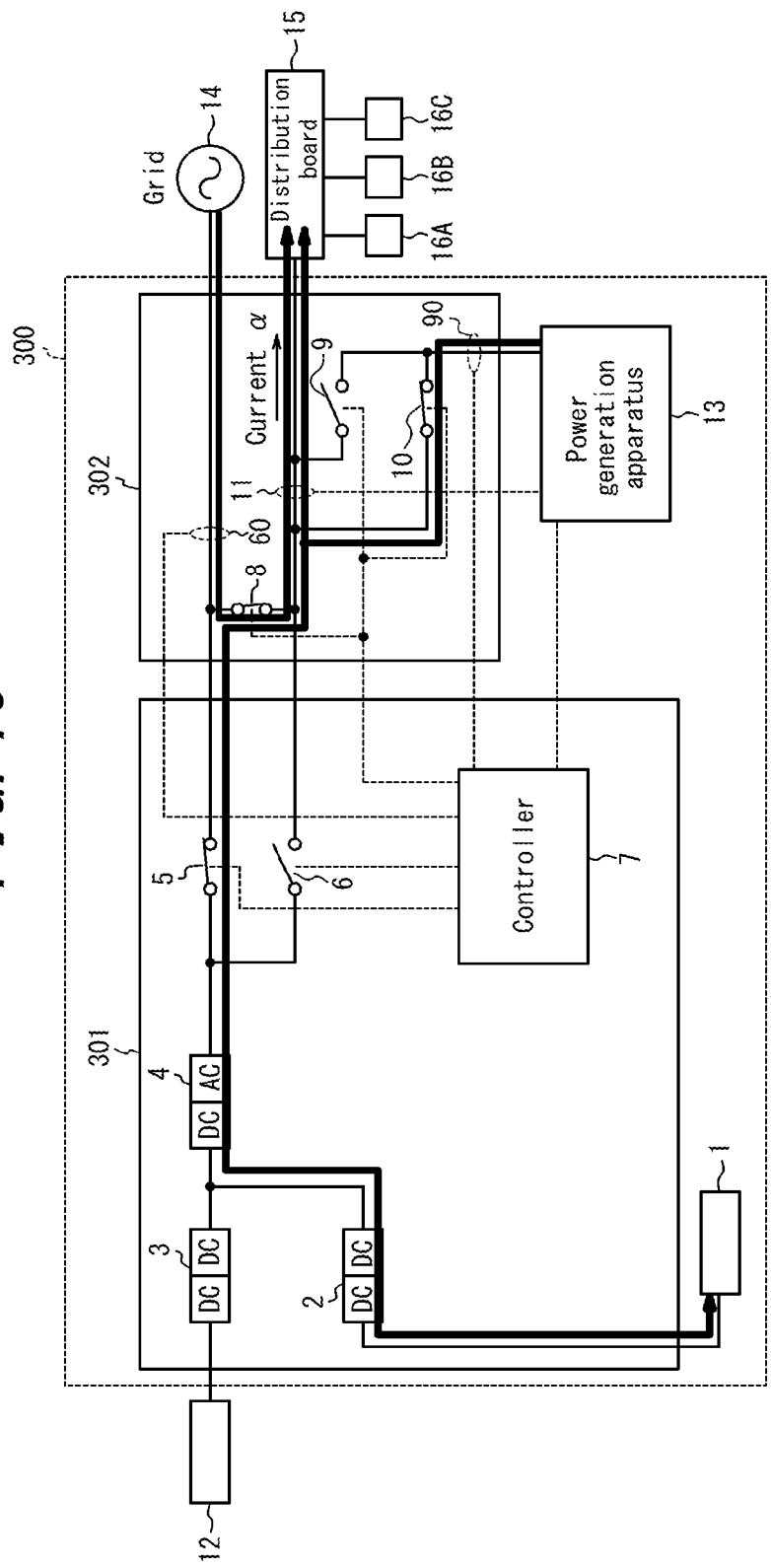
FIG. 10 is a diagram illustrating an example of control of the power supply system during the interconnection operation (during charging) according to the third embodiment of the disclosure herein.

FIG. 10 is a diagram illustrating an example of control of the power supply system 300 during the interconnection operation. As for the switches, the first and second interconnection operation switches 5 and 8 are turned on, and the independent operation switch 6 is turned off. As for the switches for the changeover between the supply paths, the first supply path changeover switch 9 is turned off, and the second supply path changeover switch 10 is turned on.

During the interconnection operation, as illustrated in a bold arrow, the AC 100V (or 200 V) from the grid 14 is supplied to the loads 16A to 16C. Also, the power generated by the power generation apparatus 13 is supplied to the loads 16A to 16C via the second supply path changeover switch 10 and the first current sensor 11. Therefore, since all the current supplied to the loads 16A to 16C pass through the first current sensor 11, the first current sensor 11 may detect the forward power flow at all times. Also, the power generation apparatus 13 may perform the rated operation. Further, when the power generated by the power generation apparatus 13 exceeds the power consumption of the load 16A to 16C, the controller 7, as indicated by a bold line, stores the excessive power in the storage battery 1 via the second interconnection operation switch 8 and the first interconnection operation switch 5. Note that, while the power generated by the power generation apparatus 13 is stored in the storage battery 1, the controller 7 monitors the current flowing to the second current sensor 60 and controls the charging amount of the storage battery 1 such that the second current sensor 60 receives the forward power flow in the certain amount at all times.

Figure 11:
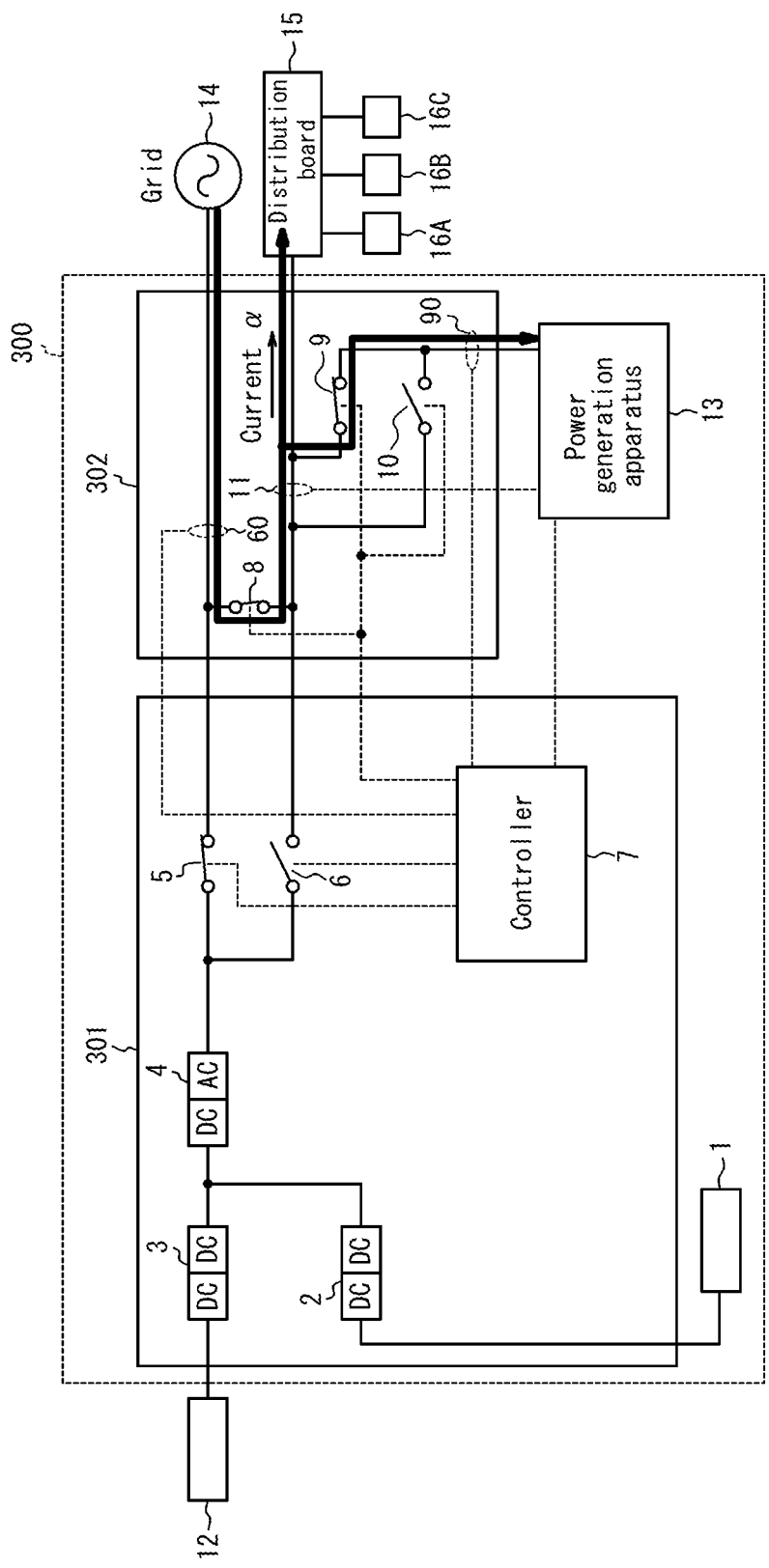
FIG. 11 is a diagram illustrating an example of control of the power supply system during the interconnection operation (during self-check) according to the third embodiment of the disclosure herein.

In an example of the control in FIG. 10, when the controller 7 determines that the power generation apparatus 13 starts the self-check in response to the change in the current detected by the third current sensor 90, the controller 7 performs changeover control to turn on the first supply path changeover switch 9 and turn off the second supply path changeover switch 10. Thereby, the first current sensor 11 detects the current flowing from the grid 14 to the loads 16A to 16C alone. At this time, since the power is not supplied from the power generation apparatus 13 to the storage battery 1, the storage battery 1 stops the charging. When the power generation apparatus 13 temporarily receives the power supply from the grid 14, a corresponding current in a forward flowing direction flows to the first current sensor 11. The power generation apparatus 13 ends a self-check operation when this current in the forward flowing direction is detected. A control state of the power supply system 300 at this time is illustrated in FIG. 11.

Then, when the current detected by the third current sensor 90 stops changing, the controller 7 determines that the self-check is completed and once again performs the changeover control to turn off the first supply path changeover switch 9 off and turn on the second supply path changeover switch 10. Thereby, the power generation apparatus 13 resumes storing the excessive power in the storage battery 1.

For the determination of the start and the end of the self-check performed by the power generation apparatus 13, various methods may be used other than using the third current sensor 90. For example, a signal informing that the power generation apparatus 13 is executing the self-check may be output and, based on the signal from the power generation apparatus 13, the controller 7 may control to turn off/on the first supply path changeover switch 9 and the second supply path changeover switch 10. Or, the controller 7 may recognize that the self-check is being executed by communicating with the power generation apparatus 13.

Example of Control During Independent Operation

Figure 12:
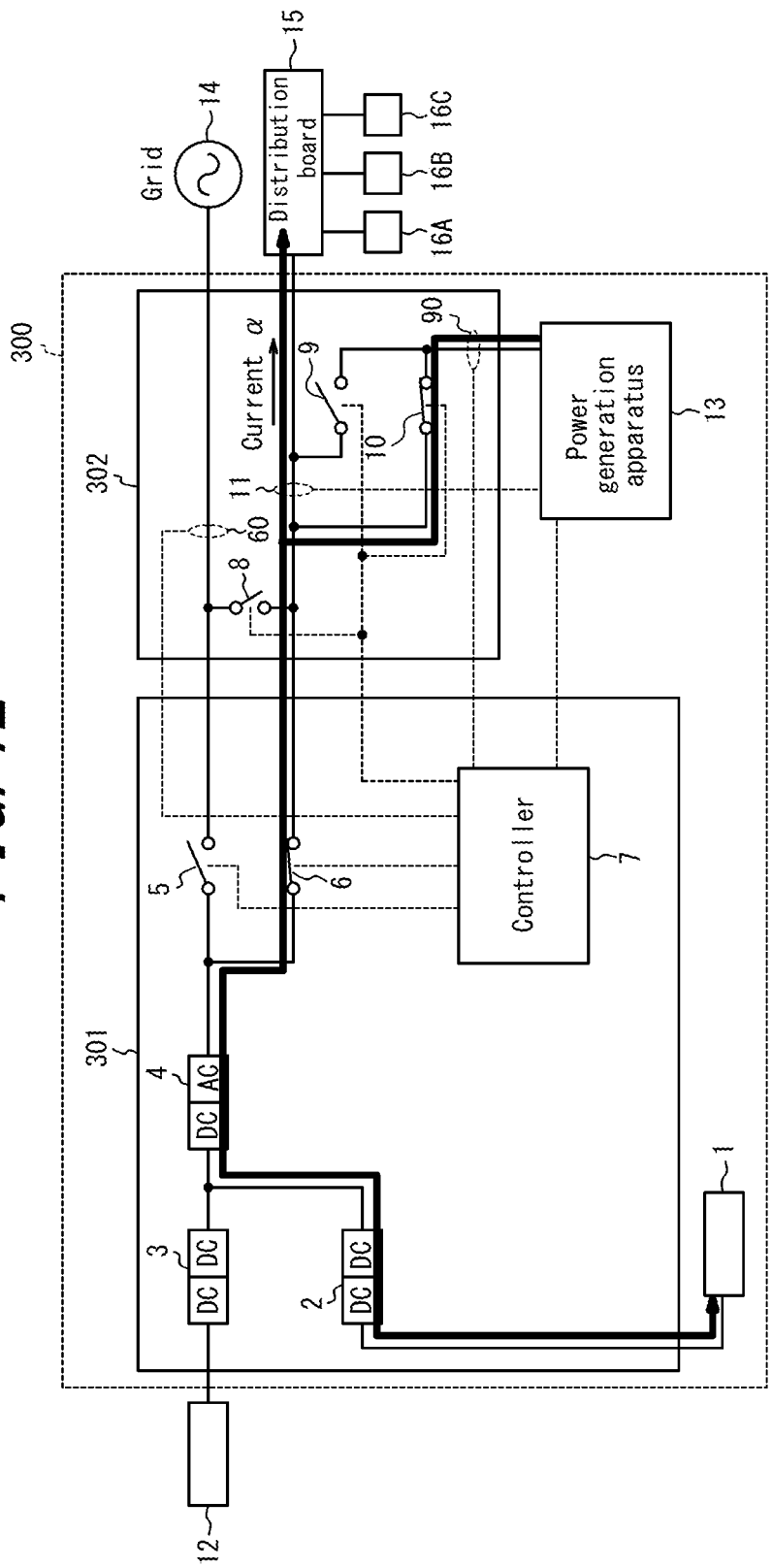
FIG. 12 is a diagram illustrating an example of control of the power supply system during the independent operation (during charging) according to the third embodiment of the disclosure herein.
Figure 13:
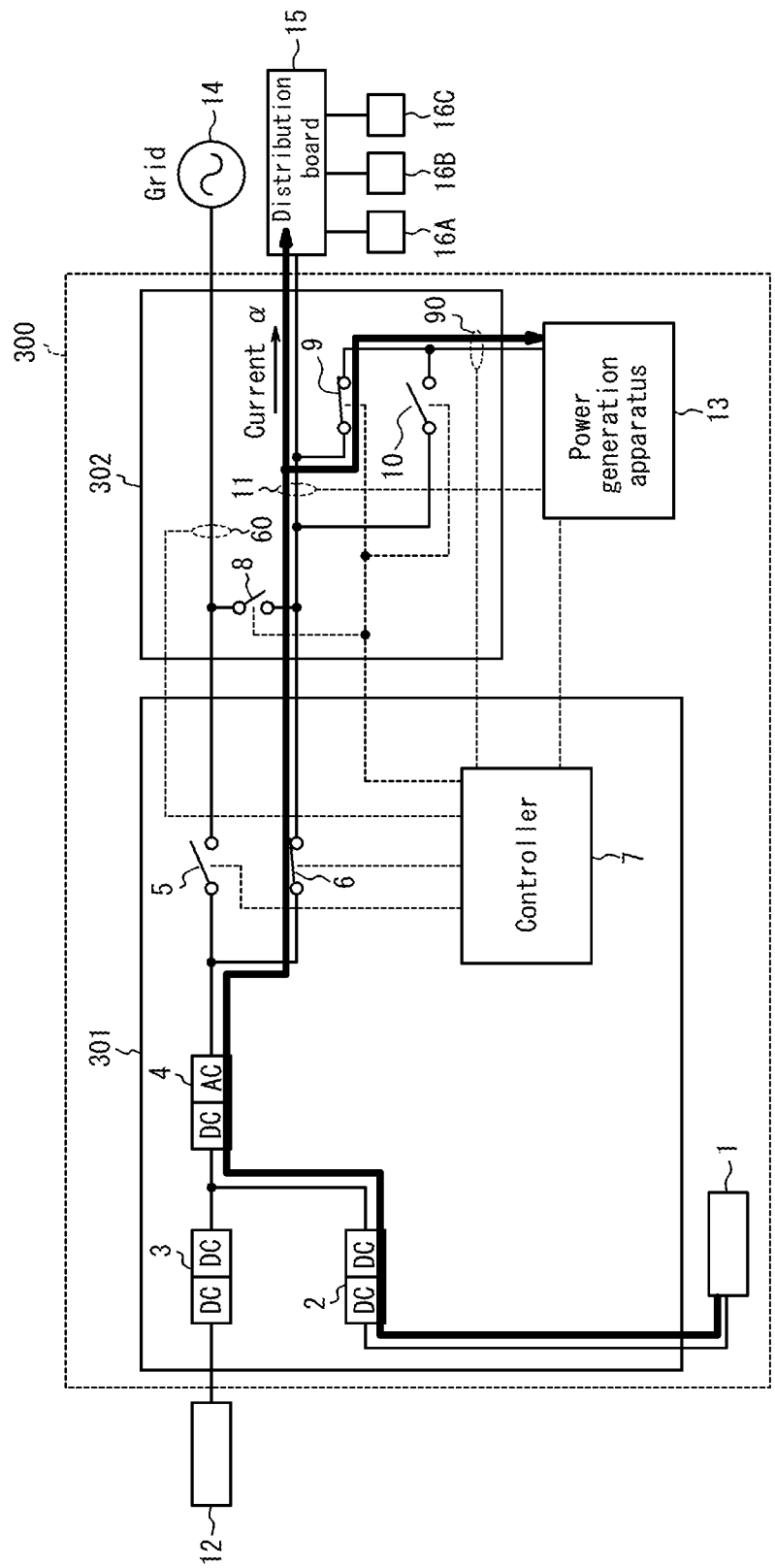
FIG. 13 is a diagram illustrating an example of control of the power supply system during the independent operation (during the self-check) according to the third embodiment of the disclosure herein.

Referring to FIG. 12, next, an example of control of the power supply system 300 during the independent operation will be described. As for the switches, the first and second interconnection operation switches 5 and 8 are turned off, and the independent operation switch 6 is turned on. As for the switches for the changeover between the supply paths, the first supply path changeover switch 9 is turned off, and the second supply path changeover switch 10 is turned on.

FIG. 12 is an example of the control in which, during the independent operation, when the loads 16A to 16C are consuming at least a certain amount of power at all times, the power generation apparatus 13 generates the power by performing the rated operation. Since the second supply path changeover switch 10 is ON, the power generated by the power generation apparatus 13 is supplied to the loads 16A to 16C via the first current sensor 11. As a result, since the power from each of the distributed power sources (the solar cell 12, the storage battery 1, and the power generation apparatus 13) is supplied to the loads 16A to 16C via the first current sensor 11 and the distribution board 15, the first current sensor 11 detects the forward power flow at all times, and the power generation apparatus 13 may generate power by performing the rated operation. Although the power generated by the power generation apparatus 13 is supplied to the loads 16A to 16C as indicated by a bold line in FIG. 12, when the generated power exceeds the power consumption of the loads 16A to 16C, such excessive power is stored in the storage battery 1.

In the example of the control in FIG. 12, when it is determined that the power generation apparatus 13 starts the self-check in response to the change in the current detected by the third current sensor 90, the controller 7 performs the changeover control to turn on the first supply path changeover switch 9 and turn off the second supply path changeover switch 10 and, simultaneously, causes the storage battery 1 to start discharging. The power discharged from the storage battery 1 flows via the first current sensor 11, and the power generation apparatus 13 temporarily receives the power supply from the storage battery 1. A current in the forward flow direction corresponding to the power supply from the storage battery 1 to the power generation apparatus 13 flows to the first current sensor 11, and the power generation apparatus 13 completes the self-check upon detection of the current in the forward flow direction.

According to the present embodiment, as described above, at the timing the power generation apparatus 13 executes the self-check, the first supply path changeover switch 9 is turned on and the second supply path changeover switch 10 is turned off, such that the first current sensor 11 may detect the current flowing from the grid 14 or the storage battery 1 to the power generation apparatus 13. This configuration allows the excessive power of the power generation apparatus 13 to be stored in the storage battery 1 and, also, may handle a self-check function of the power generation apparatus 13.

According to the present embodiment, also, since the third current sensor is provided at the output section of the power generation apparatus 13 to detect the self-check operation, the excessive power of the power generation apparatus 13 may be stored in the storage battery 1 and, also, a simple configuration may handle the self-check function of the power generation apparatus 13.

According to the present embodiment, further, since the power generation apparatus 13 outputs the signal informing that the power generation apparatus 13 is executing the self-check, and the controller 7 may detect the self-check operation by receiving the signal from the power generation apparatus 13, the excessive power of the power generation apparatus 13 may be stored in the storage battery 1 and, also, the simple configuration may handle the self-check function of the power generation apparatus 13.

Although the disclosure herein has been described based on the figures and the embodiments, it is to be understood that those who are ordinarily skilled in the art may easily implement various modifications and changes based on the disclosure herein. Accordingly, such modifications and changes are included in the scope of the disclosure herein. For example, functions and the like included in each constituent, means, and step may be rearranged without logical inconsistency, so as to combine a plurality of means or steps together or to separate them.

Many aspects of the disclosure herein may be represented by a series of operations executed by a computer system or other hardware those are capable of executing a program instruction. The computer system or the other hardware includes, for example, a general-purpose computer, a PC (personal computer), a special purpose computer, a workstation, PCS (Personal Communications System; a personal mobile communication system), an RFID receiver, an electronic notepad, a laptop computer, a GPS (Global Positioning System) receiver, and other programmable data processing apparatuses. Note that in the embodiment the various operations are executed by a dedicated circuit implemented with a program instruction (software) (e.g., discrete logic gates interconnected to perform a specific function), or a logical block, a program module and the like executed by at least one processor. The at least one processor for executing the logical block, the program module and the like includes, for example, at least one microprocessor, CPU (Central Processing Unit), ASIC (Application Specific Integrated Circuit), DSP (Digital Signal Processor), PLD (Programmable Logic Device), FPGA (Field Programmable Gate Array), a processor, a controller, a microcontroller, a microprocessor, an electronic apparatus, and other apparatuses designed to be capable of executing the functions described herein, and/or a combination thereof. The embodiment presented herein is implemented by, for example, hardware, software, firmware, middleware, a microcode, or any combination thereof. The instruction may be a program code or a code segment for executing a necessary task. The instruction may be stored in a machine-readable non-transitory storage medium or in another medium. The code segment may represent any combination of a procedure, a function, a subprogram, a program, a routine, a subroutine, a module, a software package, a class or an instruction, and a date structure or a program statement. The code segment, with another code segment or a hardware circuit, transmits/receives information, a data argument, a variable, and memory contents. Thereby, the code segment is connected to the another code segment or the hardware circuit.

The network used herein includes, unless otherwise specified, the Internet, an ad hoc network, LAN (Local Area Network), a cellular network, WPAN (Wireless Personal Area Network), other networks, or combinations any of them. Components of a radio network include, for example, an access point (e.g., a Wi-Fi access point), a Femtocell, and the like. Further, a radio communication apparatus maybe connected to a radio network that uses the Wi-Fi, Bluetooth® (Bluetooth is a registered trademark in Japan, other countries, or both), a cellular communication technique (e.g. CDMA (Code Division Multiple Access), TDMA (Time Division Multiple Access), FDMA (Frequency Division Multiple Access), OFDMA (Orthogonal Frequency Division Multiple Access), SC-FDMA (Single-Carrier Frequency Division Multiple Access), or other wireless technologies and/or technical standards.

Also, a machine-readable non-transitory storage medium used herein may include a solid state memory or a tangible carrier (medium) readable by the computer such as a magnetic disk and an optical disk, and stores an appropriate set of computer instructions such as program modules and a data structure those for causing the processor to execute the technique disclosed herein. The computer-readable medium includes an electric connection with at least one wiring, a magnetic disk storage media, a magnetic cassette, a magnetic tape, other magnetic and optical storage devices (e.g., a CD (Compact Disk), LaserDisc® (LaserDisc is a registered trademark in Japan, other countries, or both), DVD® (DVD is a registered trademark in Japan, other countries, or both), a floppy Disk® (floppy disk is a registered trademark in Japan, other countries, or both), and Blu-ray Disc® (Blu-ray Disc is a registered trademark in Japan, other countries, or both)), a portable computer disk, RAM (Random Access Memory), ROM (Read-Only Memory), a ROM such as an EPROM, an EEPROM, or a flash memory that is rewritable and programmable, other tangible storage media capable of storing information, or any combination thereof. The memory may be provided inside and/or outside the processor/processing unit. Here, the term "memory" means all types of a long-term memory, a short-term memory, a volatile memory, a non-volatile memory, and other memories. A type of the memory, the number of memories, and a type of the medium to store the information are not limited.

Note that the system disclosed herein includes various modules and/or units for executing specific functions, and the modules and/or the units are schematically illustrated for the purpose of brief description of functionality thereof and do not necessarily represent specific hardware and/or software. In that sense, these modules, units, and other components may be any hardware and/or software implemented to substantially execute the specific functions described herein. Various functions of different components may be substantialized by combining or separating the hardware and/or the software in any manner, and may be used separately or in any combination. Further, an input/output or I/O device and a user interface may be a keyboard, a display, a touch screen, a pointing device, and the like but not limited thereto, and may be connected to the system directly, or via an I/O controller that intervenes. As described above, various aspects of the disclosure herein may be implemented in various embodiments, and all the various embodiments are included in the scope of the disclosure herein.

REFERENCE SIGNS LIST 1 storage battery
2, 3 DC-DC converter
4 inverter
5 first interconnection operation switch
6 independent operation switch
7 controller
8 second interconnection operation switch (interconnection operation switch)
9 first supply path changeover switch
10 second supply path changeover switch
11 first current sensor
12 solar cell
13 power generation apparatus
14 grid (commercial power supply system)
15 distribution board
16A, 16B, 16C load
17 dummy-current control switch
18 dummy-current load
19 dummy-output line
20 power line
60 second current sensor
90 third current sensor
100, 200, 300 power supply system
101, 201, 301 power supply apparatus
102, 202, 302 dedicated distribution board

The invention claimed is:

1. A power supply system having a plurality of distributed power sources including a storage battery and a power generation apparatus configured to generate power while forward power flow is detected, the power supply system comprising:
an interconnection operation switch to be closed during an interconnection operation such that an output from a grid is supplied to a load;
a first current sensor disposed between the interconnection operation switch and the load, and configured to detect the forward power flow;
a first supply path changeover switch capable of closing such that an output from the power generation apparatus is supplied to the load without passing through the first current sensor; and
a second supply path changeover switch capable of closing such that the output from the power generation apparatus is supplied to the load via the first current sensor,
wherein, during an interconnection operation, the interconnection operation switch and the first supply path changeover switch are closed, and the second supply path changeover switch is opened, and
during an independent operation, the interconnection operation switch is opened, and based on whether the battery is being charged or discharging, one of the first supply path changeover switch and the second supply path changeover switch is closed.

2. The power supply system according to claim 1, wherein, during an interconnection operation, the interconnection operation switch and the first supply path changeover switch are closed, and the second supply path changeover switch is opened, and during an independent operation, the interconnection operation switch and the first supply path changeover switch are opened, and the second supply path changeover switch is closed.

3. The power supply system according to claim 1, further comprising a second current sensor between the grid and the interconnection operation switch, wherein
during an interconnection operation, when the second current sensor detects power supply from the grid to the interconnection operation switch, the interconnection operation switch and the second supply path changeover switch are closed, and the first supply path changeover switch is opened and, during the interconnection operation, when the second current sensor does not detect the power supply from the grid to the interconnection operation switch, the interconnection operation switch and the first supply path changeover switch are closed, and the second supply path changeover switch is opened, and during an independent operation, the interconnection operation switch and the first supply path changeover switch are opened, and the second supply path changeover switch is closed.

4. The power supply system according to claim 1, wherein the power generation apparatus has a mode of checking a function of the first current sensor to detect the forward power flow, and when the checking is performed, the first supply path changeover switch is closed, and the second supply path changeover switch is opened.

5. The power supply system according to claim 4, wherein a third current sensor configured to detect timing of the checking is further disposed between the first supply path changeover switch and the second supply path changeover switch.

6. The power supply system according to claim 4, wherein the power generation apparatus outputs a signal to inform of timing to check a function of the first current sensor to detect the forward power flow.

7. The power supply system according to claim 1, comprising a circuit element configured to close the first supply path changeover switch in conjunction with the closing of the interconnection operation switch and to open the second supply path changeover switch in conjunction with the closing of the interconnection operation switch.

8. The power supply system according to claim 1, wherein, during the independent operation, one of, some of, or all of the plurality of distributed power sources supply power such that the first current sensor detects a dummy current of the forward power flow.

9. A control method of a power supply system having a plurality of distributed power sources including a storage battery and a power generation apparatus configured to generate power while forward power flow is detected, the control method of the power supply system comprising the steps of:
    closing an interconnection operation switch during an interconnection operation such that an output from a grid is supplied to a load;
    closing a first supply path changeover switch such that an output from the power generation apparatus is supplied to the load without passing through a first current sensor, the first current sensor being disposed between the interconnection operation switch and the load, and configured to detect the forward power flow;
    closing a second supply path changeover switch such that the output from the power generation apparatus is supplied to the load via the first current sensor;
    during an interconnection operation, closing the interconnection operation switch and the first supply path changeover switch, and opening the second supply path changeover switch; and
    during an independent operation, opening the interconnection operation switch, and based on whether the battery is being charged or discharging, closing one of the first supply path changeover switch and the second supply path changeover switch.

10. A power supply apparatus configured to control a plurality of distributed power sources including a storage battery and a power generation apparatus configured to generate power while forward power flow is detected, the power supply apparatus comprising:
    a controller configured to control;
    an interconnection operation switch to be closed during an interconnection operation such that an output from a grid is supplied to a load;
    a first supply path changeover switch capable of closing such that an output from the power generation apparatus is supplied to the load without passing through a first current sensor, the first current sensor being disposed between the interconnection operation switch and the load, and configured to detect the forward power flow; and
    a second supply path changeover switch capable of closing such that the output from the power generation apparatus is supplied to the load via the first current sensor,
    wherein, during an interconnection operation, the interconnection operation switch and the first supply path changeover switch are closed, and the second supply path changeover switch is opened, and
    during an independent operation, the interconnection operation switch is opened, and based on whether the battery is being charged or discharging, one of the first supply path changeover switch and the second supply path changeover switch is closed.

11. The power supply system according to claim 2, wherein the power generation apparatus has a mode of checking a function of the first current sensor to detect the forward power flow, and when the checking is performed, the first supply path changeover switch is closed, and the second supply path changeover switch is opened.

12. The power supply system according to claim 3, wherein the power generation apparatus has a mode of checking a function of the first current sensor to detect the forward power flow, and when the checking is performed, the first supply path changeover switch is closed, and the second supply path changeover switch is opened.

13. The power supply system according to claim 2, comprising a circuit element configured to close the first supply path changeover switch in conjunction with the closing of the interconnection operation switch and to open the second supply path changeover switch in conjunction with the closing of the interconnection operation switch.

14. The power supply system according to claim 2, wherein, during the independent operation, one of, some of, or all of the plurality of distributed power sources supply power such that the first current sensor detects a dummy current of the forward power flow.

15. The power supply system according to claim 3, wherein, during the independent operation, one of, some of, or all of the plurality of distributed power sources supply power such that the first current sensor detects a dummy current of the forward power flow.

16. The power supply system according to claim 4, wherein, during the independent operation, one of, some of, or all of the plurality of distributed power sources supply power such that the first current sensor detects a dummy current of the forward power flow.

17. The power supply system according to claim 5, wherein, during the independent operation, one of, some of, or all of the plurality of distributed power sources supply power such that the first current sensor detects a dummy current of the forward power flow.

* * * * *